(12) United States Patent
Chaturvedi et al.

(10) Patent No.: US 11,985,213 B1
(45) Date of Patent: May 14, 2024

(54) STATELESS TRIGGERING AND EXECUTION OF INTERACTIVE COMPUTING KERNELS

(71) Applicant: Pulastya Inc., San Francisco, CA (US)

(72) Inventors: Darshita Chaturvedi, San Francisco, CA (US); Shyam Swaroop, San Francisco, CA (US)

(73) Assignee: Pulastya Inc., San Francisco, CA (US)

( * ) Notice: Subject to any disclaimer, the term of this patent is extended or adjusted under 35 U.S.C. 154(b) by 0 days.

(21) Appl. No.: 18/236,476

(22) Filed: Aug. 22, 2023

(51) Int. Cl.
*G06F 15/16* (2006.01)
*H04L 67/02* (2022.01)
*H04L 67/60* (2022.01)

(52) U.S. Cl.
CPC .............. *H04L 67/60* (2022.05); *H04L 67/02* (2013.01)

(58) Field of Classification Search
CPC ................................ H04L 67/60; H04L 67/02
See application file for complete search history.

(56) References Cited

U.S. PATENT DOCUMENTS

| | | | | |
|---|---|---|---|---|
| 11,113,715 | B1 * | 9/2021 | Schmutz | H04L 67/02 |
| 11,513,772 | B1 * | 11/2022 | Gross | H04L 67/10 |
| 2015/0154012 | A1 * | 6/2015 | Wolfram | G06F 8/75 |
| | | | | 717/176 |
| 2021/0174321 | A1 * | 6/2021 | Rose | H04L 41/22 |
| 2021/0360083 | A1 * | 11/2021 | Duggal | H04L 67/34 |
| 2022/0159056 | A1 * | 5/2022 | Rose | G06F 21/32 |
| 2022/0337578 | A1 * | 10/2022 | Mankekar | G06F 21/41 |
| 2023/0403197 | A1 * | 12/2023 | Shami | H04L 41/0896 |

FOREIGN PATENT DOCUMENTS

KR       20230132143 A  *  9/2023   ............. H04L 67/02

* cited by examiner

*Primary Examiner* — Richard G Keehn
(74) *Attorney, Agent, or Firm* — Cognition IP, P.C.; Edward Steakley; Schiller Hill

(57) ABSTRACT

Methods, systems and apparatus for the stateless triggering and execution of code cell of computational documents residing on a server. The system may use an API layer to receive triggers from a client device, interpret the triggers to identify code cells to be executed, identify the computational documents on the server in which code cells reside, schedule the execution of the code cells, collect the results of the execution of the code cells and send those results back to the client device.

17 Claims, 12 Drawing Sheets

400B

STATELESS TRIGGERING AND EXECUTION OF INTERACTIVE COMPUTING KERNELS

FIELD

The present invention relates generally to systems, tools and methods to allow for the stateless triggering and execution of interactive computing kernels.

BACKGROUND

Interactive development environments and computing platforms allow users to configure and arrange workflows in data science, scientific computing, computational journalism, and machine learning. These platforms let users create and share computational documents with one another. The computational documents mix code, results of running the code in graphical form and documentation in a single document.

Deployment of code from computational documents traditionally is only performed by converting the code into a program or script file that must then be run by a server.

SUMMARY

The system and methods described herein provide for the stateless triggering and execution of one or more execution cells of one or more computational documents. In some embodiments, the system may comprise a client device, wherein the client device comprises a processing unit configured to execute a client application module.

In some embodiments the system may further comprise a server, wherein the server further comprises memory, a server processing unit, a network module, one or more computational documents and an application programming interface (API). Each of the one or more computational documents may comprise one or more execution cells and one or more execution results cells.

In some embodiments, application programming interface (API) may comprise a trigger handler module, an execution scheduling module, a resource configuration module, a cell execution module and an output channel module. The trigger handler module may be configured to receive a trigger from the client application module. The execution scheduling module may be configured to schedule execution of the one or more execution cells of the one or more computational documents. The scheduling of execution may be based at least partly on the trigger. The resource configuration module may be configured to allocate one or more server resources to the one or more execution cells. The allocating may be based at least partly on the trigger. The cell execution module may be configured to receive a reference to each of the one or more execution cells. The cell execution module may be further configured to execute each execution cell based at least partly on the trigger, the received reference, the scheduling of the execution scheduling module and the allocating of resources by the resource configuration module. The output channel module may be configured to identify one or more of the one or more execution results cells, store the identified one or more execution results cells in one or more output payloads and send, over one or more output channels, the one or more payloads to the client application module.

In some embodiments, the trigger may comprise an execution context, one or more input parameters, an output selector, one or more output variables, one or more output channels, a resource configuration, a scheduler configuration, a chaining configuration, a replay/retry configuration, a raw inputs array and/or a file map.

In some embodiments, there may be one or more execution contexts, one or more output selectors, one or more resource configurations, one or more scheduler configurations, one or more chaining configurations, one or more replay/retry configurations, one or more chaining configurations, one or more raw inputs arrays and/or one or more file maps.

In some embodiments, the one or more input parameters may be scoped input parameters or global input parameters.

In some embodiments, the trigger may be an HTTP based API call, webhook or event bridge.

In some embodiments, the identifying one or more of the one or more execution results cells may be based on the output selector of the trigger.

In some embodiments, the one or more output channels may comprise an HTTP response body, a webhook, an event bridge, a WebRTC client, a message queue or storage.

In some embodiments, each of the one or more payloads may be sent over one of the one or more output channels based on the trigger. In some embodiments, all of the one or more payloads are sent over a single output channel. In some embodiments, a plurality of output channels may be used to send a plurality of payloads.

The features and components of these embodiments will be described in further detail in the description which follows. Additional features and advantages will also be set forth in the description which follows, and in part will be implicit from the description, or may be learned by the practice of the embodiments. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1:
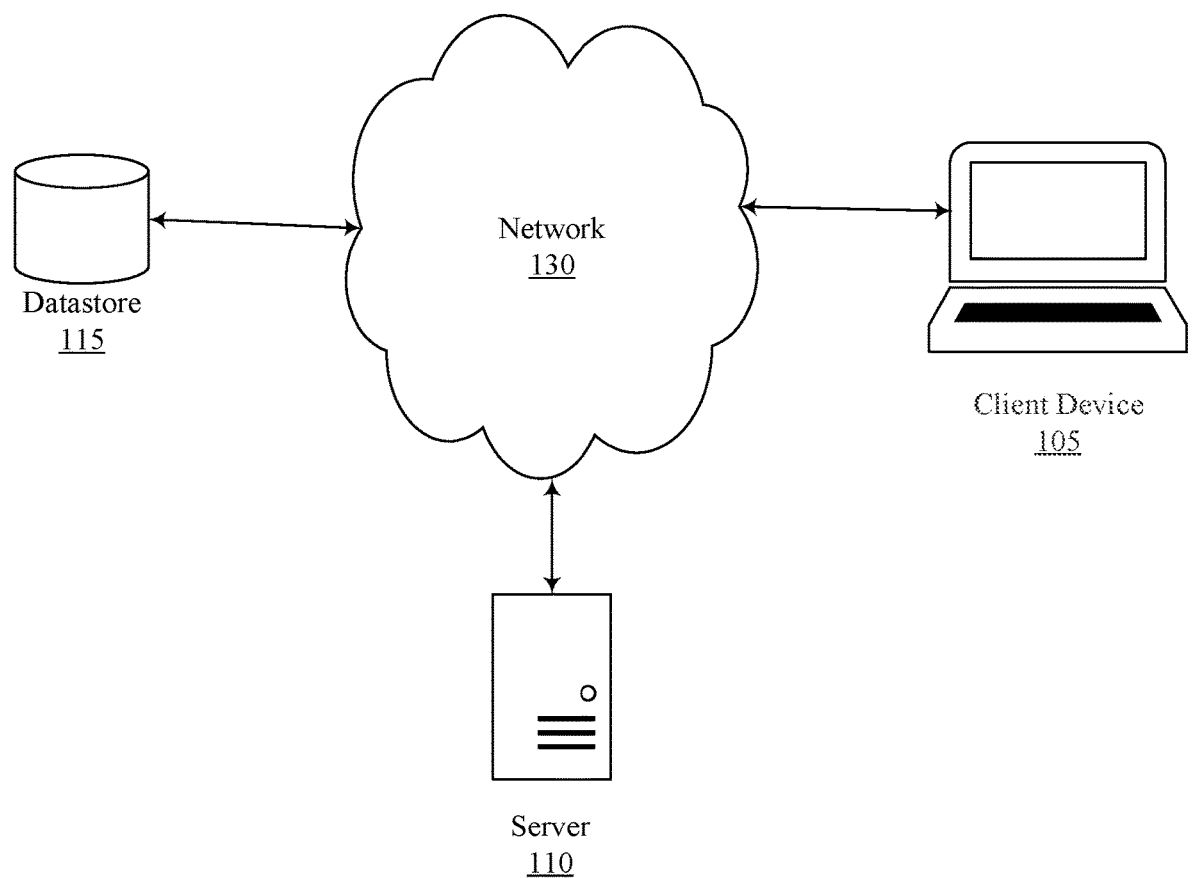
FIG. 1 is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1 is a diagram illustrating an exemplary computational document development and deployment environment 100 in which some embodiments may operate. The computational document development and deployment environment 100 may comprise one or more client devices 105, one or more servers 110, one or more datastores 115 and one or more networks 130.

The client devices 105 may be any computing device capable of communicating over network 130. The client devices 105 may be integrated into a notebook computer, smartphone, personal digital assistant, desktop computer, tablet computer, or other computing device.

Server 110 may be one or more physical or virtual machines configured to communicate with the one or more client devices 105 and the one or more datastores 115. The one or more servers 110 may be configured as a distributed computing infrastructure and processing of applications and other software may be carried out on the cloud. In some embodiments, the server 110 may be configured to receive one or more triggers from the one or more client devices 105. The server 110 may also compose an application programming interface (API), wherein the API exposes to client devices 105 and modules operating on the client devices, one or more computational documents and one or more cells of the one or more computational documents, Datastores 115 may communicate with one another over network 130. Datastores 115 may be any storage device capable of storing data for processing or as a result of processing information at the client devices 105 and/or servers 110. The datastores 115 may be a separate device or the same device as server 110. The datastores 115 may be located in the same location as that of server 110, or at separate locations.

Network 130 may be an intranet, internet, mesh, LTE, GSM, peer-to-peer or other communication network that allows the one or more servers 110 to communicate with the one or more client devices 105 and datastores 115.

Figure 2A:
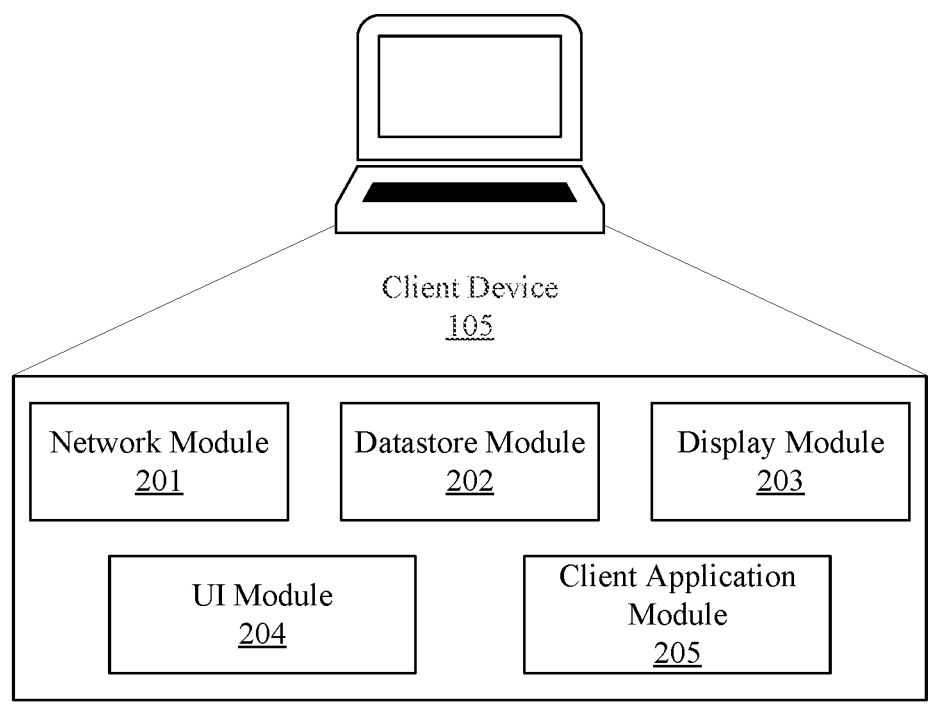
FIG. 2A is a diagram illustrating an exemplary client device in accordance with aspects of the present disclosure.

FIG. 2A is a diagram illustrating an exemplary client device 105 in accordance with aspects of the present disclosure. Client device 105 may comprise network module 201, datastore module 202, display module 203, UI module 204 and client application module 205. Network module 201 may transmit and receive data from other computing systems via a network. In some embodiments, the network module 201 may enable transmitting and receiving data from the Internet. Data received by the network module 201 may be used by the other modules. The modules may transmit data through the network module 201.

The datastore module 202 may be configured to store information generated by the one or more modules operating on the client device 105. The one or more modules operating on the client device 105 may also retrieve information from the datastore module 202.

Display module 203 may be any device configured to display graphical representations of information (LCD display, OLED display, DLP display, etc.).

UI module 204 may be configured to allow a user to create, modify/edit and/or initiate execution of one or more code cells in one or more computational documents. In some embodiments, the user may interact with the one or more code cells through the UI module 204. In some embodiments, the user may interact with a computational document residing on the client device. Code execution requests may be generated by the UI module 204 based on the user interaction with the computational document. The code execution requests may be sent to server 110 to trigger the execution of code cells. In some embodiments, UI module 204 may also be configured to receive code execution responses from the server 110. Result cells associated with the executed code cells may be configured to receive and display these code execution responses.

In some embodiments, the computational document may reside on server 110, and the UI module 204 may be configured to allow the user to interact with the computational documents and code cells of the computational documents in the same manner as described above with regards to computational documents that reside on the client device.

Client application module 205 may be configured to generate one or more API triggers. The one or more API triggers may comprise one or more execution contexts, one or more input parameters, one or more scoped input parameters, one or more global input parameters, one or more output selectors, one or more output variables, one or more output channels, one or more resource configurations, one or more scheduler configurations, one or more chaining configurations, one or more replay/retry configurations, one or more raw inputs arrays, one or more file maps or combination thereof. In some embodiments, the one or more API triggers may be sent from the client application module 205 to an API layer residing on the server 110.

For example, the client application module 205 may be configured to trigger the execution of a plurality of code cells, wherein the code cells reside in different computational documents. The client application module may generate an API trigger with a list of code cells to be executed, references to the computational document in which each code cell resides, the location of each code cell within that computational document, an order in which to execute the code cells in the list of code cells, an array of input values to be used in the execution of the code cells and other operational parameters needed for the execution. The client application module 205 may then send the API trigger to the API layer operating on the server 110 to facilitate the execution of the specified cells and the return of the results corresponding to the execution. The client application module 205 may then receive an API output payload sent from the API layer, wherein the API output payload corresponds to the previously sent API trigger.

Figure 2B:
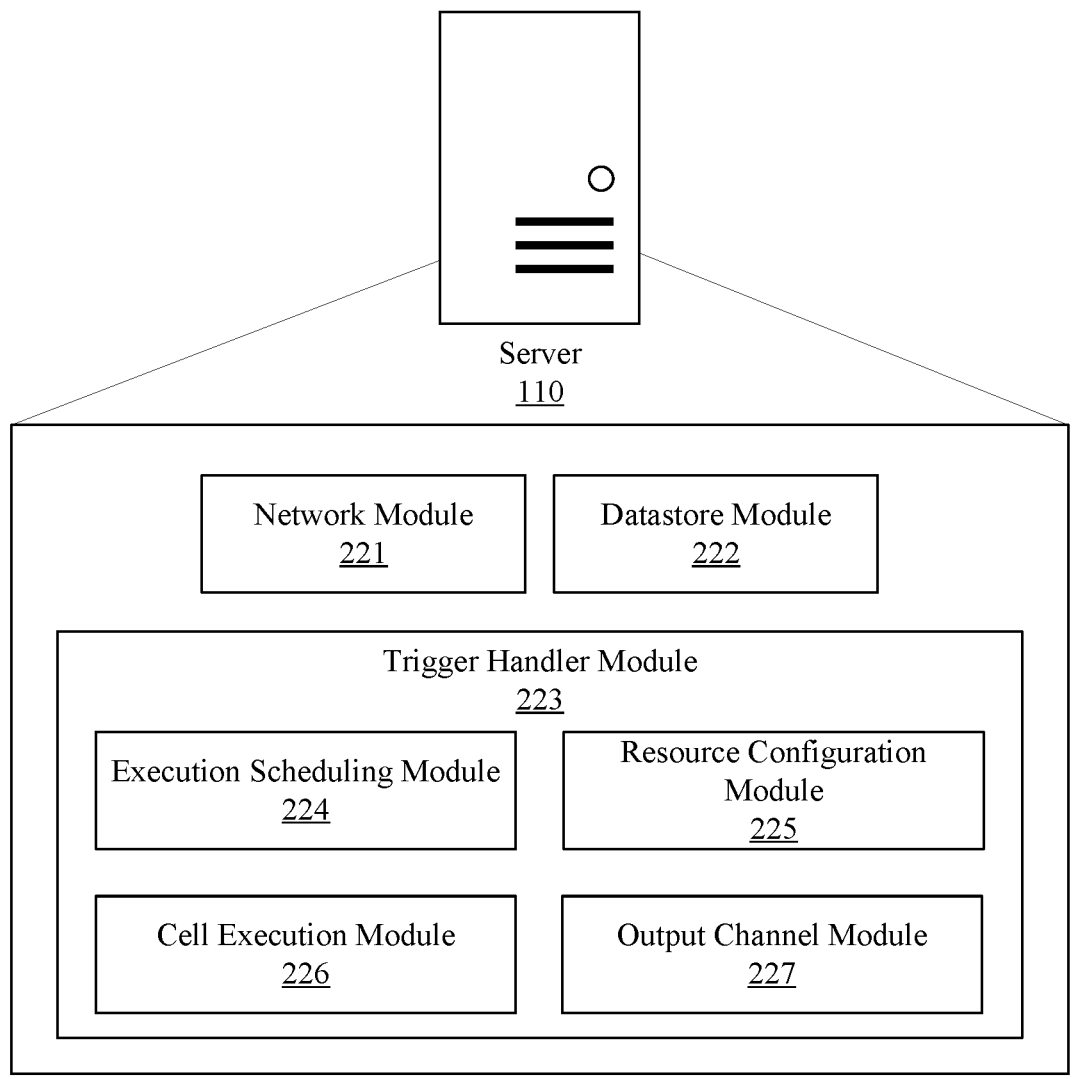
FIG. 2B is a diagram illustrating an exemplary server in accordance with aspects of the present disclosure.

FIG. 2B is a diagram illustrating an exemplary server 110 in accordance with aspects of the present disclosure. Server 110 may comprise network module 221, datastore module 222 and trigger handler module 223. Trigger handler module 223 may further comprise execution scheduling module 224, resource configuration module 225, cell execution module 226 and output channel module 227.

Network module 221 and datastore module 222 may be the same or similar to that of network module 201 and datastore module 202 in FIG. 2A and will not be described for the sake of brevity.

Trigger handler module 223 may be configured to receive one or more triggers from client device 105. In some embodiments, a trigger may be a signal to the server 110 that may comprise execution information in the form of trigger parameters. The execution information of a trigger may be in other forms, such as data structures and other digital objects. Trigger parameters may include one or more of the following: execution context, input parameters, scoped input parameters, global input parameters, output selector, output variable, output channel, resource configuration, scheduler configuration, chaining configuration (how computational documents can access each other's data), replay/retry configuration, raw inputs array and a file map. In some embodiments, the triggers may be HTTP based API calls, webhooks or event bridges.

In some embodiments, an execution context may define the cells that are to be executed by using the pair of computational document references and cell references. A computation document reference may specify the computational document that is to be executed. A cell reference may specify the cells of the computational document that are to be executed. In some embodiments, a cell reference may be a cell ID/cell number, name of a named cell, a cell range (range of cell numbers) or combination thereof.

In some embodiments, an input parameter may comprise a key-value pair. The key value pair may be a global variable in the computational document scope before executing any cell. Scoped input parameters may be key-value pairs that define a variable's scoped to a specific cell or group of cells. In some embodiments, a global input parameter may be a key-value pair that may be defined as a variable scoped to all the computational documents chained in a trigger.

In some embodiments, a raw inputs array may be configured to provide raw input values. An execution context may have multiple calls to the raw inputs array, hence, raw inputs may be provided in form of an array. In some embodiments, the form of the raw inputs array may be other data structures configured to store one or more raw inputs for inclusion in the trigger.

In some embodiments, an output selector may be configured to choose the output cells to be sent back as output payload. The output payload may comprise data that is sent over an output channel after the one or more cells have been executed. This data may be the output of cells execute upon a trigger. The output channel may comprise an HTTP response body, Webhook, Event bridge, WebRTC client, Message Queue and/or storage. In some embodiments, the output channel for each cell in the trigger may be different.

In some embodiments, output variables may be variables from global scope or scope of the cells in the execution context that are to be returned over the output response.

In some embodiments, a trigger parameter may contain a file map of identifiers and the binary data of files. In some embodiments, a named cell may be a cell that has a name/id that can be used in the trigger instead of cell number or other identifiers. The file map may also contain some metadata related to the files. For a call like 'open(<filename>)' etc., if the filename matches an identifier in the file map, then it may open the corresponding file instead of a file from the disk (local storage of the server).

In some embodiments, a resource configuration may specify which cells should use what resources during execution. In some embodiments, resources may comprise a number of CPUs, GPU memory, or other operational parameters/resources that are to be used by the trigger.

In some embodiments, a scheduler configuration may specify which cells should be scheduled to run asynchronously. A cell may run asynchronously as a CRON Job, async python function or any other asynchronous function.

In some embodiments, a replay configuration may be used to define parameters related to the replaying of cells upon failure. For example, the replay configuration may be set to replay a failed cell a predetermined number of times before halting the operation. This may allow a long chain of cell executions to recover from the failing of a single cell. It may be configured to allow the execution to be resumed without the need to re-run previously executed cells.

In some embodiments, a chaining configuration may be configured to chain together cells in different computational documents. For example, the output of one cell and the global variables in that cell may be exposed to the next cell and so on.

In some embodiments, the one or more triggers may comprise a subset of the possible trigger parameters. In some embodiments, trigger parameters that are missing or left blank may be replaced with a default value by the trigger handler module 223. The trigger handler 223 may further be configured with instructions for handling missing or null trigger parameters. The trigger handler 223 may be configured to receive one or more default handling profiles for handling missing trigger parameter values. A user may be allowed to create, edit and/or delete the one or more default handling profiles. The user may select one or more default handling profiles to be used for one or more received triggers. In some embodiments, the selection of the one or more default handling profiles to be used by the trigger handler module 223 may be performed independent of receiving the one or more triggers. For example, a user may interact or interface with the trigger handle module 223 over a network and issue instruction or otherwise indicate a selection of one or more of the one or more default handling profiles to be used.

In some embodiments, the trigger itself may include a selection of one or more default handling profiles to be used for the current and/or subsequent triggers to use. In some embodiments, the trigger may also include a default handling profile to be added to the trigger handler module 223. This default handling profile may be used in the handling of the trigger it was included in, future triggers or combination thereof.

In some embodiments, some trigger parameters may be required while others may be optional. In some embodiments, a trigger parameter that is optional may become required based on a value or content of a required parameter or a value or content of an optional parameter included in the trigger.

In some embodiments, the execution context may be optional and include no values. If the output selector has no value, the trigger handler module 223 may set the output to be void. The output handler may be configured to be one of a plurality of possible output handlers based on the default handling profile selected used by the trigger handler module 223. If the one or more output channels are left empty or not received, the default value may be set to HTTP response.

In some embodiments, the resource configuration, scheduler configuration, chaining configuration, replay/retry configuration, raw inputs array and file map may be optional.

The execution scheduling module 224, may be configured to schedule the synchronous and asynchronous execution of the one or more cells identified in the trigger. The execution scheduler may determine the timing of execution of each of the cells.

The resource configuration module 225 may be configured to allocate resources to one or more of the cells to be processed. In some embodiments, the resource configuration module may allocate resources on a per cell basis. In some embodiments, the resource configuration module may allocate resources to groups of cells and/or all cells identified in the trigger.

The cell execution module 226 may be configured to execute the commands of the cells. The cell execution module 226 may receive instructions to execute a cell from the execution scheduling module 224 as well as access to resources for execution of the cell, provided by the resource configuration module 225.

The output channel module 227 may be configured to determine an output selector, wherein the choosing comprises determining, based on information in the trigger, which output cells are to be sent back as output payload. The chosen output cells may then be aggregated into the output payload. The output channel module 227 may then send the output payload over an output channel to the trigger source. In some embodiments the trigger source may be a client device 105.

Figure 3A:
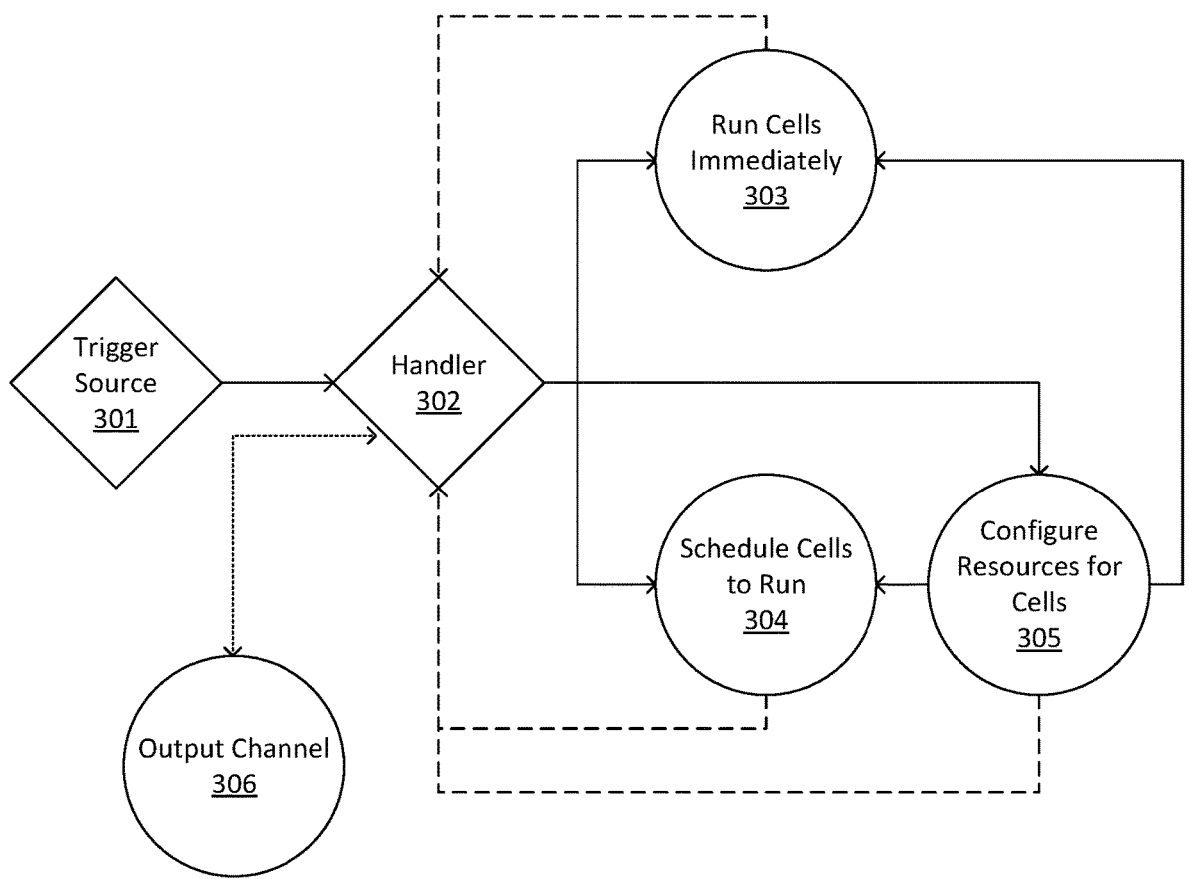
FIG. 3A is an exemplary flow diagram of the operation of an API in accordance with aspects of the present disclosure.

FIG. 3A is an exemplary flow diagram 300A of the operation of an API in accordance with aspects of the present disclosure. Flow diagram 300A shows an API that may be used in the development and/or interactive execution of a computational document. In some embodiments, a user may execute one or more cells of a computational document by sending one or more triggers from a trigger source 301 to a handler 302. The trigger may include one or more lines of code to be executed, references to one or more additional cells in one or more additional computational documents, and other information/resources needed for the scheduling configuration and running of the cells. Handler 302 may direct the system to run cells immediately 303, schedule cells to run 304, or configure resources for the cells. When cells are run immediately, the results may be returned to the handle and sent back to the user through an output channel 306. When the handler 302 schedules cells to run 304, the cells may be placed into a queue or other list of cells to be run at a future time. Other cells may be run in between the scheduling of a cell to run and the subsequent running of that cell. This may allow for asynchronous execution of cells in a computational document. In some embodiments, the handler may configure resources for cells 305, which may then be used by the cell when run. After configuration, the handler 302 may then proceed to schedule cells to run 304 before processing additional triggers or cells of a trigger already received.

Figure 3B:
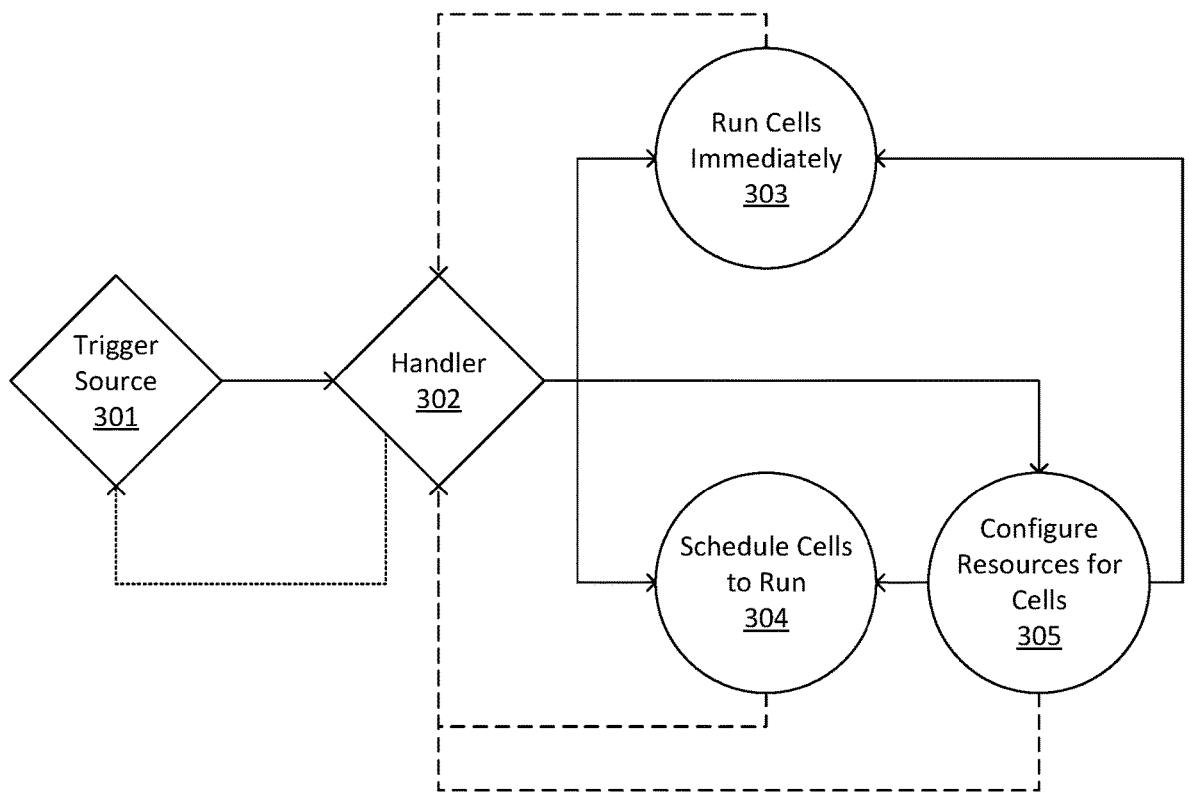
FIG. 3B is an exemplary flow diagram of the operation of an API in accordance with aspects of the present disclosure.

FIG. 3B is an exemplary flow diagram 300B of the operation of an API in accordance with aspects of the present disclosure. Flow diagram 300B shows an API that may be used as a deployed system or application. The operation of the API is similar to that recited above with regard to FIG. 3A. The deployed API may however differ in the way in which input and output are processed. In some embodiments, a user may execute one or more cells of a computational document by sending one or more triggers from a trigger source 301 to a handler 302, as is performed in FIG. 3A. However, after the handler runs the cell immediately 303, the results may be stored by the handler to be used in subsequent run cells instead of outputting the results to a user. When a cell requires input, the handler may access predetermined input data to be used in the running of the cells. The predetermined input data may be stored in an array of values that can be used to replace user inputs and simulate the interactive execution of a computational document.

Figure 4A:
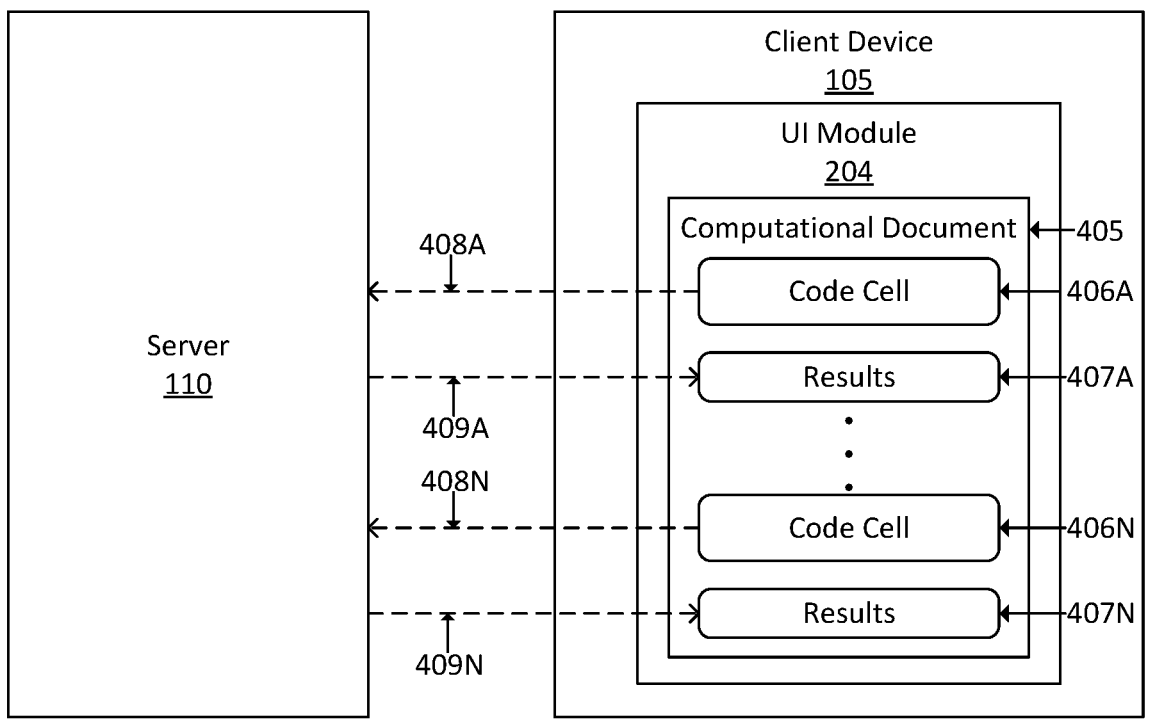
FIG. 4A is an exemplary system diagram showing the operation of an interactive computing environment in accordance with aspects of the present disclosure.

FIG. 4A is an exemplary system diagram showing the operation of an interactive computing environment 400A in accordance with aspects of the present disclosure. The interactive computing environment 400A may comprise client device 105 and server 110. In some embodiments, client device 105 may comprise UI module 204, wherein the user may interact with a computational document 405. The computational document 405 may comprise code cells 406A-N and results 407A-N. The user may execute or run the code cells 406A-N by sending code execution requests 408A-N to server 110. The server may perform the operations defined in the code cells 406A-N and return the results 407A-N by sending code execution responses 409A-N to the computational document 405. In some embodiments the server 110 and the client device 105 may be the same device, and the sending of code execution requests 408A-N and returning of code execution responses 409A-N may be performed between modules within the device. In some embodiments the server 110 and the client device 105 may be different devices, and the sending of code execution requests 408A-N and returning of code execution responses 409A-N may be performed over a network.

Figure 4B:
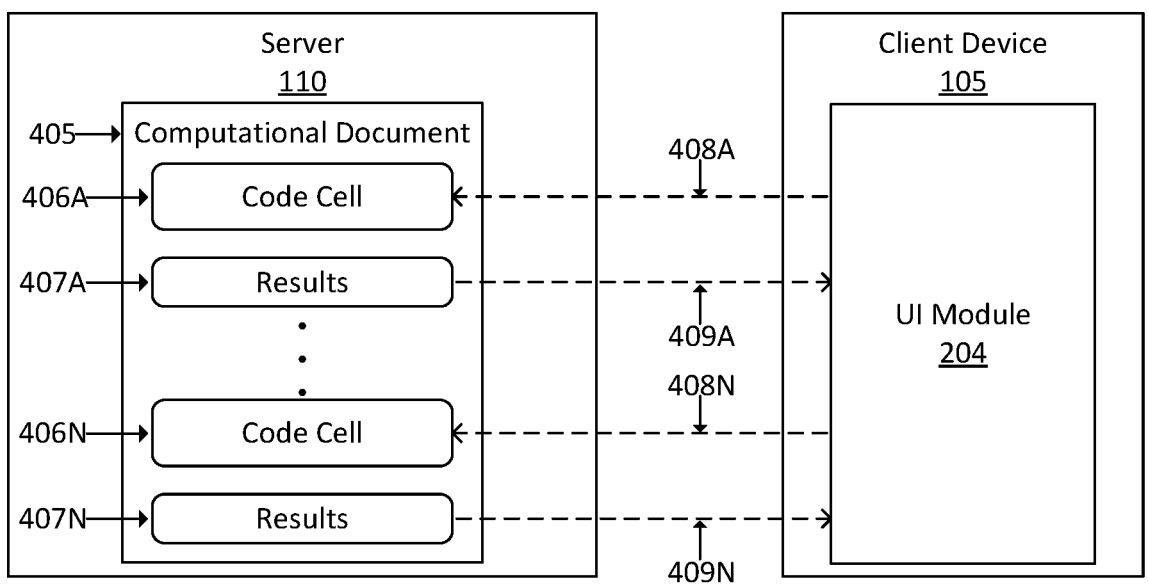
FIG. 4B is an exemplary system diagram showing the operation of an interactive computing environment in accordance with aspects of the present disclosure.

FIG. 4B is an exemplary system diagram showing the operation of an interactive computing environment 400B in accordance with aspects of the present disclosure. The interactive computing environment 400B of FIG. 4B may operate in a similar manner as that of the interactive computing environment 400A of FIG. 4A. However, computational document 406 may be stored/created on server 110 and the user may access/interact with the computational document 406 through the UI module 204 on client device 105. In some embodiments, the UI module 204 may generate code execution requests 408A-N corresponding to code cells 406A-N and send them to the server. The server may then run the code cells 406A-N to generate results 407A-N. The results 407A-N may then be returned to the client device 105 and displayed to the user through UI module 205.

Figure 4C:
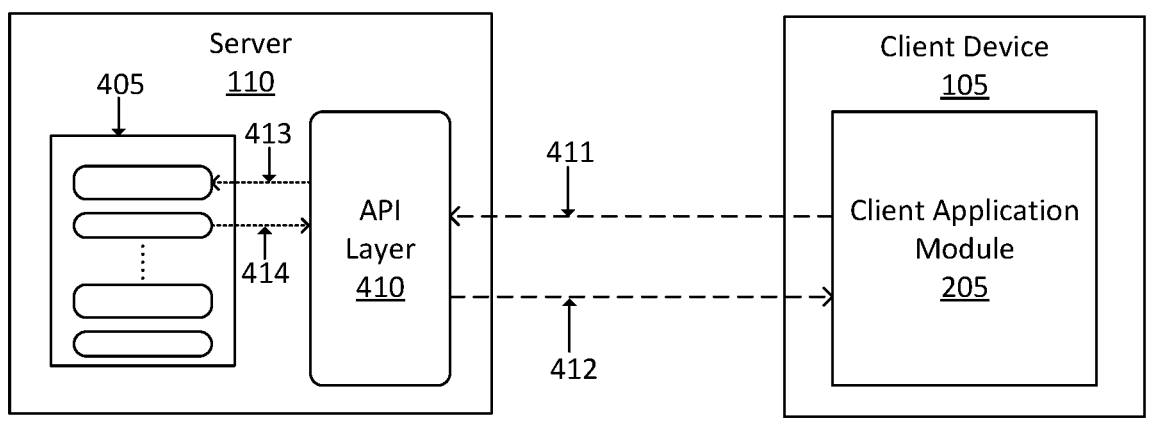
FIG. 4C is an exemplary system diagram showing the stateless triggering and execution of interactive computing kernels in accordance with aspects of the present disclosure.

FIG. 4C is an exemplary system diagram showing the stateless triggering and execution of interactive computing kernels in accordance with aspects of the present disclosure. FIG. 4C shows client device 105 running a client application module 205 in communication with server 110. Server 110 may comprise computational document 405 and API layer 410.

In some embodiments, the client application module 205 may be configured to access and run cells of computational document 405 by sending API trigger 411 to the API layer 410. The API layer 410, after receiving the API trigger 411, may run a cell of the computational document by sending a cell trigger 413. The results of running the cell may then be returned to the API layer 410 as cell output 414. The API layer 410 may then be configured to return the results, by sending an API output payload 412, to the client application module 205.

Figure 4D:
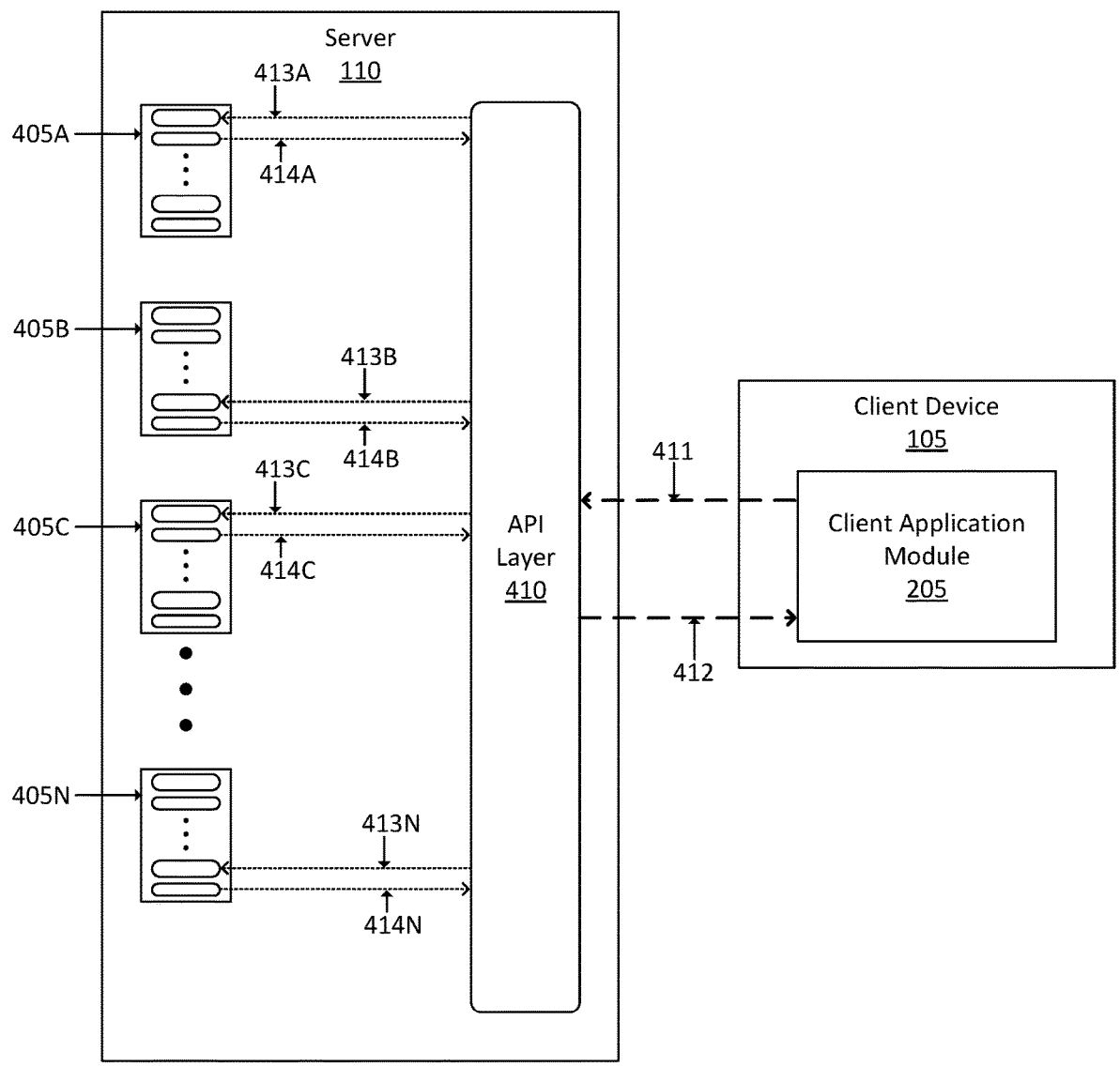
FIG. 4D is an exemplary system diagram showing the stateless triggering and execution of interactive computing kernels in accordance with aspects of the present disclosure.
Figure 4E:
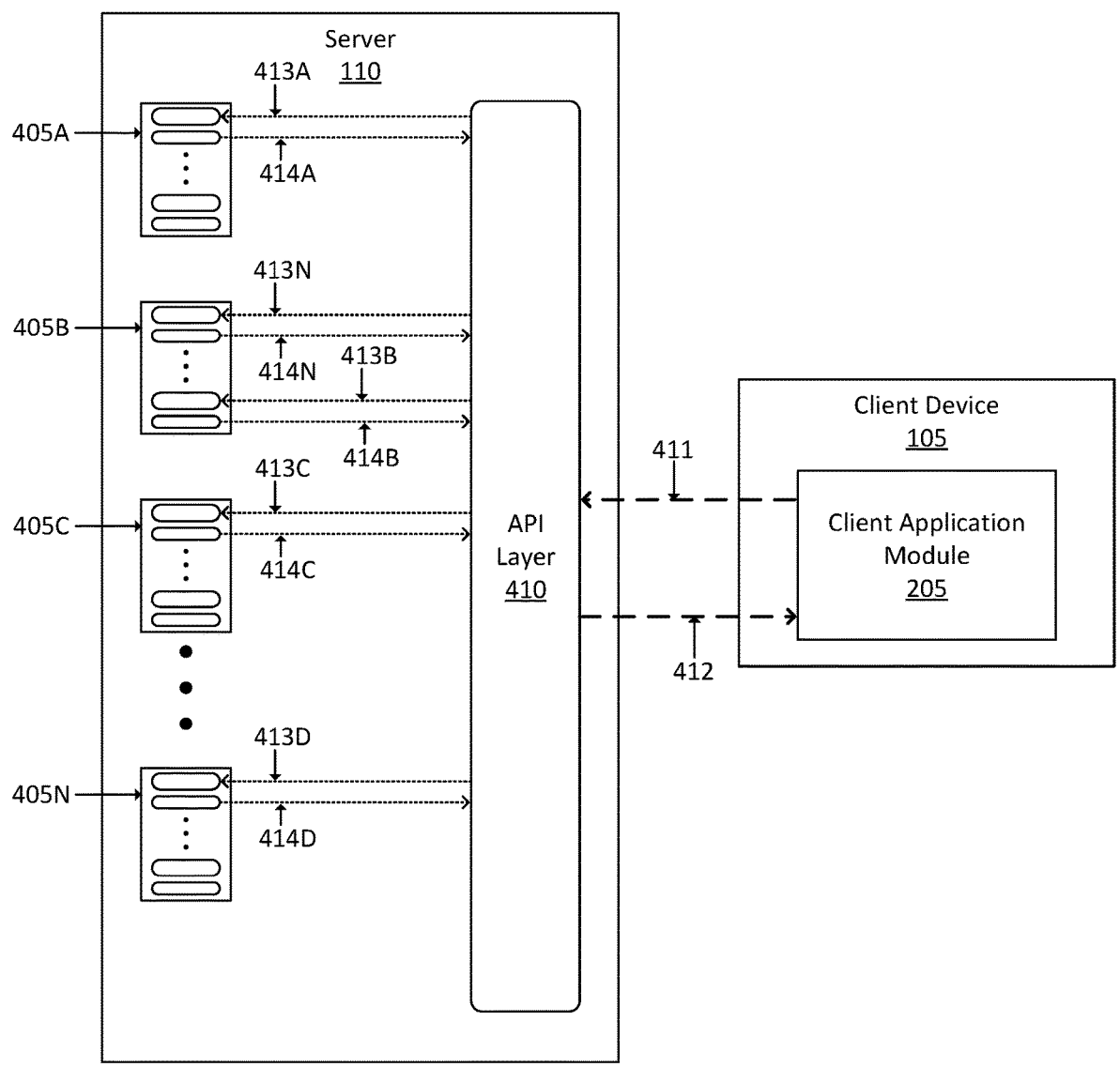
FIG. 4E is an exemplary system diagram showing the stateless triggering and execution of interactive computing kernels in accordance with aspects of the present disclosure.

FIGS. 4D-4E are exemplary system diagrams showing the stateless triggering and execution of interactive computing kernels in accordance with aspects of the present disclosure. FIGS. 4D-4E show client device 105 running a client application module 205 in communication with server 110. Server 110 may comprise computational documents 405A-N and API layer 410.

In some embodiments, the client application module 205 may be configured to access and run one or more cells of one or more computational documents 405A-N by sending API trigger 411 to the API layer 410. The API layer 410, after receiving the API trigger 411, may run one or more cells of the one or more computational documents 405A-N by sending cell triggers 413A-N. The results of running the one or more cells may then be returned to the API layer 410 as cell outputs 414A-N.

In some embodiments, the API trigger 411 may comprise an ordered list of one or more cells to be run and references to the one or more cells. The references to the one or more cells may comprise a location, name and/or other identification for the computational document in which the cell resides and a position within the document where the cell is located. The ordered list of one or more cells may be stored in a queue by/in the API layer 410. A cell trigger 413 may be generated for each of the cells listed in the queue. Each cell trigger 413 may be configured to cause an associated cell to run. The results of the running of the associated cell may then be returned to the API layer 410 through cell output 414. In some examples, for every API trigger 411 received by the API layer 410, cell triggers 413A-N(corresponding to the cells listed in the trigger) may be generated and sent. For each cell trigger 413A-N, a corresponding cell output 414A-N may be used to retrieve results from the running of the associated cells. After all the cells listed in the queue have been run and results for each have been received by the API layer 410, an API output payload 412 may be generated. The API output payload may comprise one or more results received as a result of the running of the one or more cells listed in the corresponding API trigger 411. API output payload 412 may then be sent to the client application module 205.

In some embodiments, the API trigger 411 may also comprise one or more arrays of predetermined input values to be used in the running of the referenced one or more cells of the one or more computational documents. The one or more predetermined input values may be stored locally by the API layer as global input variables. These global input variables may be used in the running of the one or more cells. In some embodiments, the global input variables may be used to store results of the running of the one or more cells. In some embodiments, the API layer may store the results of the running of the cells in one or more global result variables. The global result variables may be configured to store intermediate values produced during the running of the cell and/or a final result value determined at the end of running of the cell.

Figure 4F:
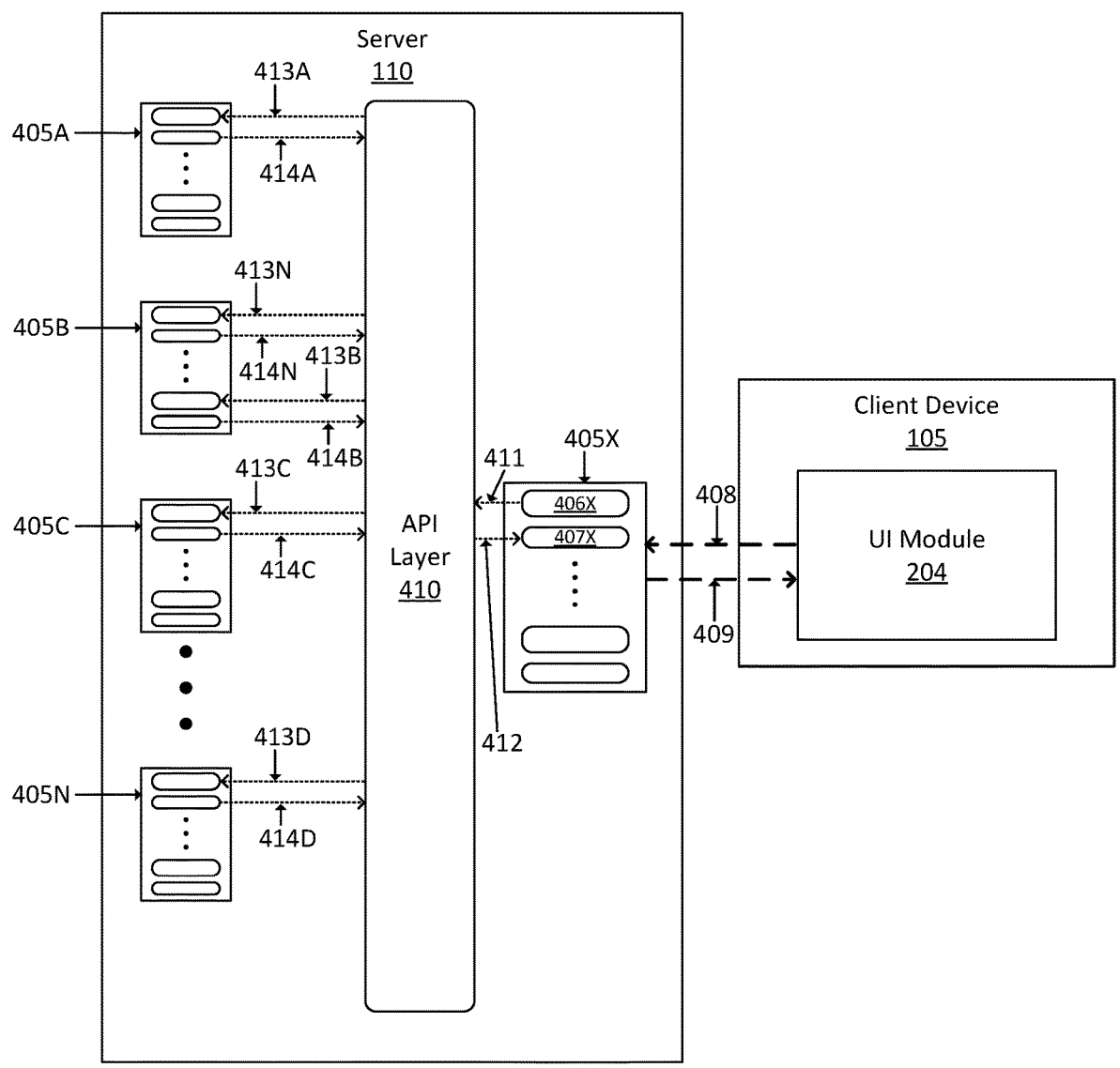
FIG. 4F is an exemplary system diagram showing the stateless triggering and execution of interactive computing kernels in accordance with aspects of the present disclosure.

FIG. 4F is an exemplary system diagram showing the stateless triggering and execution of interactive computing kernels in accordance with aspects of the present disclosure. FIG. 4F shows client device 105 running a UI module 205 in communication with server 110. Server 110 may comprise computational documents 405A-N, user executed computational document 405X and API layer 410. User executed computational document 405X may comprise one or more user executed code cells 406X and user executed results 407X. In some embodiments, a user may create, access, modify and/or run user executed computational document 405X through interaction with UI module 204. The UI module 204 may send one or more code execution request 408 to the user executed computational document 405X. The user executed computational document 405X may then run the user executed code cell 406X associated with the code execution request 408. One or more API triggers 411 may be generated as the result of running each of the one or more user executed code cells 406X. A corresponding API output payload 412 may then be received for each API trigger 411 generated. The API output payload 412 may be received by the user executed code cells 406X that generated the corresponding API trigger 411 or by a user executed results 407X associated with the user executed code cells 406X. For example, if the API trigger 411 is generated during an intermediate step of a user executed code cell 406X, the API output payload 412 may be returned to the user executed code cell 406X. If the API trigger 411 results in the final value of the user executed code cell 406X, the API output payload 412 may be returned to the user executed result 407X associated with the user executed code cell 406X. After the user executed result 407X received the API output payload 412, a code execution response 409 may be returned to the UI module 204.

In FIG. 4F, the operation of the API layer 410 is the same or similar to that of FIGS. 4C-E. The only difference being the source of the API trigger 411.

Figure 5:
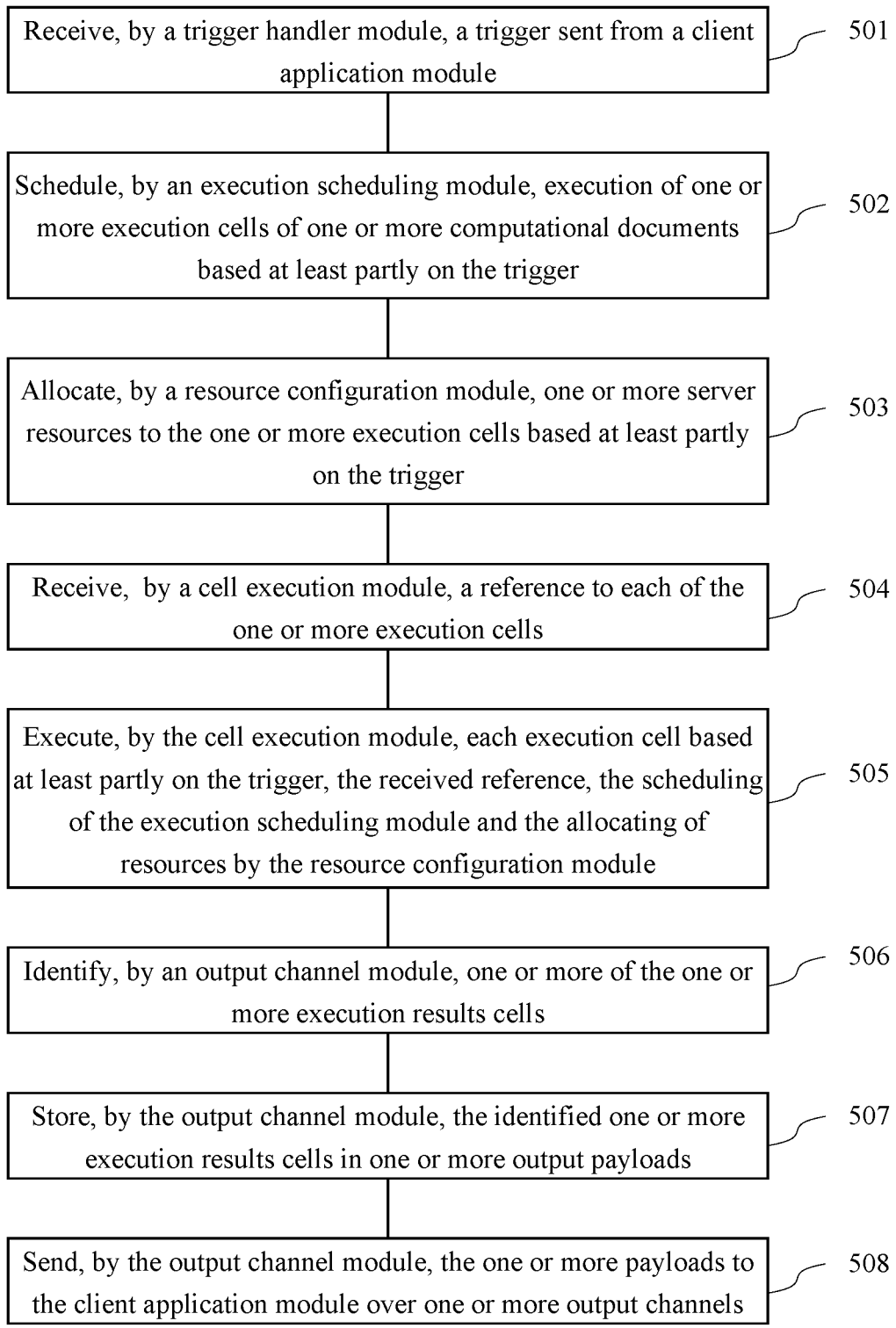
FIG. 5 is a flow chart illustrating an exemplary method that may be performed in accordance with some embodiments.

FIG. 5 is a flow chart illustrating an exemplary method 500 that may be performed in accordance with some embodiments.

At step 501, the system is configured to receive, by a trigger handler module, a trigger sent from a client application module.

At step 502, the system is configured to schedule, by an execution scheduling module, execution of one or more execution cells of one or more computational documents based at least partly on the trigger.

At step 503, the system is configured to allocate, by a resource configuration module, one or more server resources to the one or more execution cells based at least partly on the trigger.

At step 504, the system is configured to receive, by a cell execution module, a reference to each of the one or more execution cells.

At step 505, the system is configured to execute, by the cell execution module, each execution cell based at least partly on the trigger, the received reference, the scheduling of the execution scheduling module and the allocating of resources by the resource configuration module.

At step 506, the system is configured to identify, by an output channel module, one or more of the one or more execution results cells.

At step 507, the system is configured to store, by the output channel module, the identified one or more execution results cells in one or more output payloads.

At step 508, the system is configured to send, by the output channel module, the one or more payloads to the client application module over one or more output channels.

Figure 6:
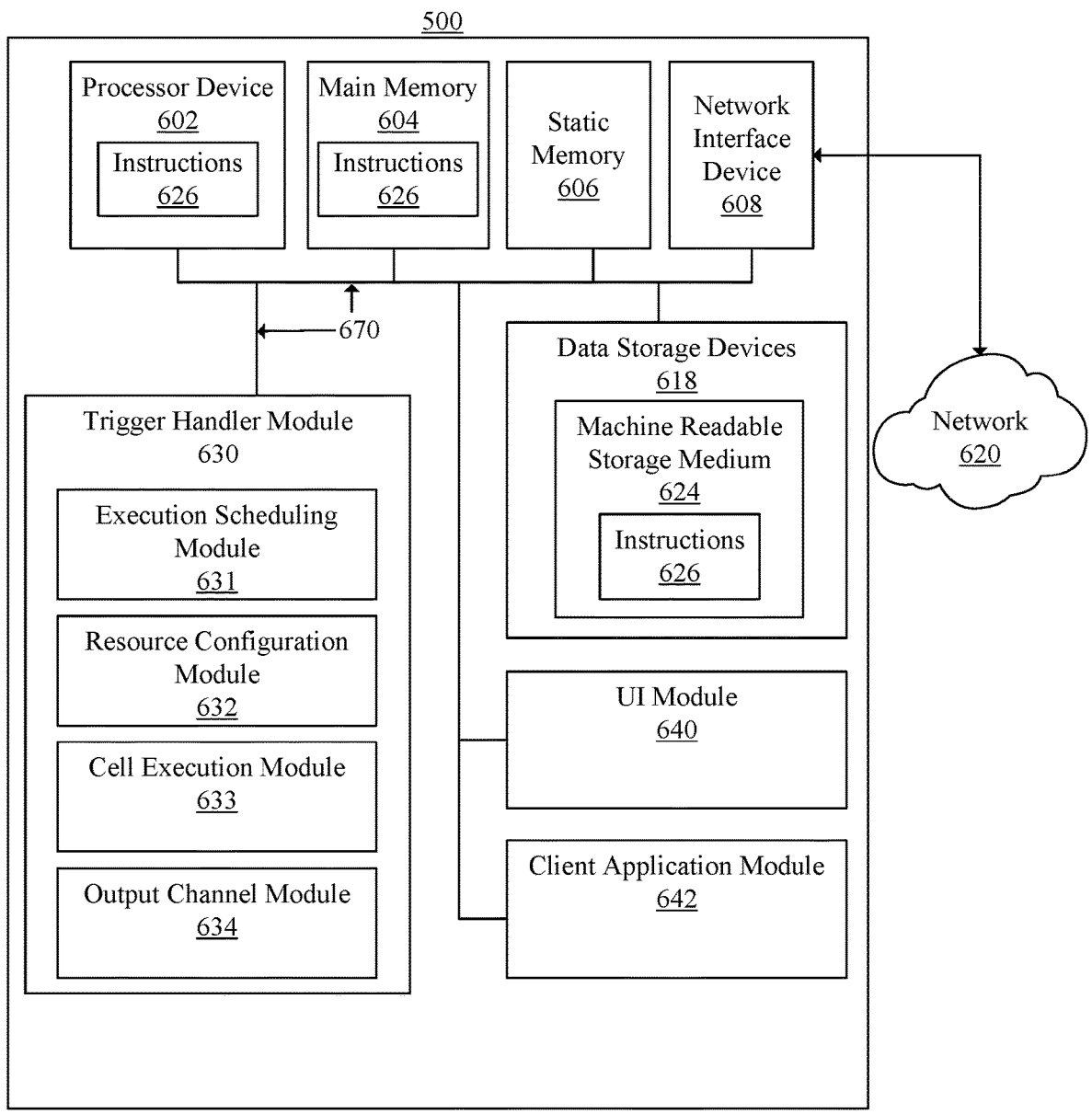
FIG. 6 is a diagram illustrating an exemplary computer/control system that may perform processing in some embodiments and in accordance with aspects of the present disclosure.

FIG. 6 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, an ad-hoc network, a mesh network, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 660.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620. The computer system 600 also may include sensor array trigger handler module 630. Trigger handler module 630 may comprise execution scheduling module 631, resource configuration module 632, cell execution module 633 and output channel module 634.

Trigger handler module 630 may comprise execution scheduling module 631, resource configuration module 632, cell execution module 633 and output channel module 634. Trigger handler module 630, execution scheduling module 631, resource configuration module 632, cell execution module 633 and output channel module 634 may be the same or similar to that of trigger handler module 223, execution scheduling module 224, resource configuration module 225, cell execution module 226 and output channel module 227 as disclosed in FIG. 2B.

The computer system 600 may further include UI module 640 and client application module 642. UI module 640 and client application module 642 may be the same or similar to that of the UI module 204 and client application module 205 disclosed in FIG. 2A.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media. Information, including data used in the processes and methods of the system and the one or more sets of instructions or software, may also be stored in blockchain, as NFTs or other decentralized technologies.

In one implementation, the instructions 626 include instructions to implement functionality corresponding to the components of a device to perform the disclosure herein. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A stateless triggering and execution system, the system comprising:
   a client device, wherein the client device comprises a processing unit configured to execute a client application module;
   a server, wherein the server comprises:
      memory;
      a server processing unit;
      a network module;
      one or more computational documents, wherein each of the one or more computational documents comprise one or more execution cells and one or more execution results cells;
      an application programming interface (API), wherein the API comprises:
         a trigger handler module configured to receive a trigger from the client application module;
         an execution scheduling module configured to schedule execution of the one or more execution cells of the one or more computational documents and wherein the scheduling of execution is based at least partly on the trigger;
         a resource configuration module configured to allocate one or more server resources to the one or more execution cells and wherein the allocating is based at least partly on the trigger;
         a cell execution module, wherein the cell execution module is configured to receive a reference to each of the one or more execution cell and wherein the cell execution module is further configured to execute each execution cell, wherein the executing is based at least partly on the trigger, the received reference, the scheduling of the execution scheduling module and the allocating of resources by the resource configuration module; and
         an output channel module, wherein the output channel module is configured to:
            identify one or more of the one or more execution results cells;
            store the identified one or more execution results cells in one or more output payloads; and
            send, over one or more output channels, the one or more payloads to the client application module.

2. The system of claim 1, wherein the trigger comprises one or more trigger parameters, the one or more trigger parameters comprising:
   an execution context;
   one or more input parameters, wherein the input parameters are scoped input parameters or global input parameters;
   an output selector;
   one or more output variables;
   one or more output channels;
   a resource configuration;
   a scheduler configuration;
   a chaining configuration;
   a replay/retry configuration;
   a raw inputs array; or
   a file map.

3. The system of claim 2, wherein the trigger is an HTTP based API call, webhook or event bridge.

4. The system of claim 3, wherein the identifying one or more of the one or more execution results cells is based on the output selector of the trigger.

5. The system of claim 4, wherein the one or more output channels comprise:
   an HTTP response body;
   a webhook;
   an event bridge;
   a WebRTC client;
   a message queue; or
   storage.

6. The system of claim 5, wherein each of the one or more payloads are sent over one of the one or more output channels based on the trigger.

7. The system of claim 2, wherein the trigger handler module is further configured to:
   identify one or more missing trigger parameters of the trigger; and
   replace the identified one or more missing trigger parameters with a default value, wherein the default value is based on a default handling profile.

8. A computer-implemented method comprising the operations of:
sending, by a client device, a trigger from a client application module operating on the client device;
receiving, by a server, the trigger from the client application module, the server comprising:
a memory;
a server processing unit;
a network module;
one or more computational documents, wherein each of the one or more computational documents comprise one or more execution cells and one or more execution results cells;
an application programming interface (API), wherein the API comprises:
a trigger handler module configured to interpret the trigger received by the server from the client application module;
an execution scheduling module configured to schedule execution of the one or more execution cells of the one or more computational documents and wherein the scheduling of execution is based at least partly on the trigger;
a resource configuration module configured to allocate one or more server resources to the one or more execution cells and wherein the allocating is based at least partly on the trigger;
a cell execution module, wherein the cell execution module is configured to receive a reference to each of the one or more execution cell and wherein the cell execution module is further configured to execute each execution cell, wherein the executing is based at least partly on the trigger, the received reference, the scheduling of the execution scheduling module and the allocating of resources by the resource configuration module; and
an output channel module, wherein the output channel module is configured to:
identify one or more of the one or more execution results cells;
store the identified one or more execution results cells in one or more output payloads; and
send, over one or more output channels, the one or more payloads to the client application module.

9. The method of claim 8, wherein the trigger comprises one or more trigger parameters, the one or more trigger parameters comprising:
an execution context;
one or more input parameters, wherein the input parameters are scoped input parameters or global input parameters;
an output selector;
one or more output variables;
one or more output channels;
a resource configuration;
a scheduler configuration;
a chaining configuration;
a replay/retry configuration;
a raw inputs array; or
a file map.

10. The method of claim 9, wherein the trigger is an HTTP based API call, webhook or event bridge.

11. The method of claim 10, wherein the identifying one or more of the one or more execution results cells is based on the output selector of the trigger.

12. The method of claim 11, wherein the one or more output channels comprise:
an HTTP response body;
a webhook;
an event bridge;
a WebRTC client;
a message queue; or
storage.

13. The method of claim 12, wherein each of the one or more payloads are sent over one of the one or more output channels based on the trigger.

14. The method of claim 9, wherein the trigger handler module is further configured to:
identify one or more missing trigger parameters of the trigger; and
replace the identified one or more missing trigger parameters with a default value, wherein the default value is based on a default handling profile.

15. A non-transitory computer readable medium comprising instructions that when executed by a system comprising one or more processors, cause the one or more processors to perform operations comprising:
sending, by a client device, a trigger from a client application module operating on the client device;
receiving, by a server, the trigger from the client application module, the server comprising:
a memory;
a server processing unit;
a network module;
one or more computational documents, wherein each of the one or more computational documents comprise one or more execution cells and one or more execution results cells;
an application programming interface (API), wherein the API comprises:
a trigger handler module configured to interpret the trigger received by the server from the client application module;
an execution scheduling module configured to schedule execution of the one or more execution cells of the one or more computational documents and wherein the scheduling of execution is based at least partly on the trigger;
a resource configuration module configured to allocate one or more server resources to the one or more execution cells and wherein the allocating is based at least partly on the trigger;
a cell execution module, wherein the cell execution module is configured to receive a reference to each of the one or more execution cell and wherein the cell execution module is further configured to execute each execution cell, wherein the executing is based at least partly on the trigger, the received reference, the scheduling of the execution scheduling module and the allocating of resources by the resource configuration module; and
an output channel module, wherein the output channel module is configured to:
identify one or more of the one or more execution results cells;
store the identified one or more execution results cells in one or more output payloads; and
send, over one or more output channels, the one or more payloads to the client application module.

16. The non-transitory computer readable medium of claim 15, wherein the trigger comprises one or more trigger parameters, the one or more trigger parameters comprising:
   an execution context;
   one or more input parameters, wherein the input parameters are scoped input parameters or global input parameters;
   an output selector;
   one or more output variables;
   one or more output channels;
   a resource configuration;
   a scheduler configuration;
   a chaining configuration;
   a replay/retry configuration;
   a raw inputs array; or
   a file map.

17. The non-transitory computer readable medium of claim 16, wherein the trigger handler module is further configured to:
   identify one or more missing trigger parameters of the trigger; and
   replace the identified one or more missing trigger parameters with a default value, wherein the default value is based on a default handling profile.

* * * * *